United States Patent [19]
Teraoka et al.

[11] 3,900,363

[45] Aug. 19, 1975

[54] METHOD OF MAKING CRYSTAL

[75] Inventors: Kohta Teraoka; Toshio Nakano, both of Kawasaki, Japan

[73] Assignee: Nippon Columbia Kabushiki Kaisha, Tokyo, Japan

[22] Filed: Nov. 15, 1972

[21] Appl. No.: 306,891

[52] U.S. Cl. .................... 156/612; 156/17; 427/86; 427/248

[51] Int. Cl. .................... C23c 13/00

[58] Field of Search.... 117/106 A, 201, 213, 106 R; 156/17

[56] References Cited

UNITED STATES PATENTS

| | | | |
|---|---|---|---|
| 3,344,002 | 9/1967 | Sirtl et al. | 117/106 A X |
| 3,477,872 | 11/1969 | Amick | 117/213 X |
| 3,511,727 | 5/1970 | Hays | 156/17 |
| 3,522,118 | 7/1970 | Taylor et al. | 156/17 |
| 3,629,016 | 12/1971 | Glendinning et al. | 156/17 X |
| 3,669,774 | 6/1972 | Dismukes | 156/17 |

OTHER PUBLICATIONS

R. C. Taylor, "Epitaxial Deposition of GaAs in an Argon Atmosphere," J. Electrochem Soc., Solid State Science, April 1967, pp. 410–412.

Joyce et al., "The Vapour Phase Growth of Ga$_x$In$_{1-x}$P. Epitaxial Layers," Journal of Crystal Growth 11, No. 3, 1971, pp. 243–248.

*Primary Examiner*—Mayer Weinblatt
*Attorney, Agent, or Firm*—Hill, Gross, Simpson, Van Santen, Steadman, Chiara & Simpson

[57] ABSTRACT

A method of making a crystal having the steps of disposing a substrate into a reaction tube which is opened at its both ends, disposing a raw material to be carried by a transport agent, which is mixed into a carrier gas, at a position upstream the substrate with respect to the carrier gas flow, keeping the substrate at temperature higher than its upper limit at which a crystal is formed by a first carrier gas but within temperature range at which the crystal is formed with a second carrier gas, etching the substrate with the first carrier gas containing an etchant which is introduced into the reaction tube from its inlet near which the raw material is disposed, and introducing the second carrier gas containing the transport agent into the reaction tube in the same direction as the first carrier gas after the etching process has been finished to form a crystal on the substrate.

1 Claim, 2 Drawing Figures

METHOD OF MAKING CRYSTAL

BACKGROUND OF THE INVENTION

1. Field of the Invention

The present invention relates generally to a method of making a crystal and more particularly to a method of making a semiconductor crystal on a substrate with use of an open tube.

2. Description of the Prior Art

In the prior art, if a semiconductor crystal is made on a substrate in accordance with a vapour growth method with employment of an open tube, the substrate is at first subjected to an etching process with a vapour or gas in order to eliminate contaminants and the like adhering to the surface of the substrate on which the crystal is made and to remove distortion of the substrate.

When a crystal of a compound of elements in the III–V groups is made on a substrate on one surface, the substrate is disposed in a tube with its both ends being opened and a raw material of an element (A) selected from the III group is also disposed in the tube. In this case, the substrate is kept higher in temperature than the raw material. Thereafter, if hydrogen or an inert gas with a gaseous etchant is introduced into the tube from its one open end with the other open end, the surface to be cleaned of the substrate is etched.

After the etching process has been completed, the raw material is in turn kept high enough in temperature while the substrate is kept lower than the raw material in temperature. Then, if a mixture of hydrogen or gas which acts as a carrier with a transport agent for the raw material made of halogenide ($BC_3$) of the V-group element (B) (where C represents one of halogen elements) is introduced into the tube from its one open end, the raw material, the III-group element (A) reacts with the halogenide ($BC_3$) in thermal cracking on the raw material and the greater part thereof becomes halogenide of monad (AC) while the smaller part thereof becomes halogenide of triad ($AC_3$). These halogenides then are mixed with the carrier gas and transported to the substrate on its etched surface. In this case, since the substrate is kept in temperature lower than the raw material, the halogenide of monad (AC) is changed partially to halogenide of triad ($AC_3$) by disproponation reaction to liberate the III-group element (A). The liverated III-group element (A) then reacts with the V-group element (B) produced by the thermal cracking to form one of the III–V group compounds (AB) on the substrate as a crystal.

According to the prior art mentioned above, it is required that the substrate is made higher in temperature than the raw material when the former is subjected to an etching process, while the former is made lower in temperature than the latter when a crystal is made on the former. It is, however, very difficult in practical point of view to change the substrate from high temperature state to low temperature state in a short time.

Further, in the prior art there is a drawback that an impurity is diffused into the substrate since it is made high in temperature when it is subjected to an etching process.

SUMMARY OF THE INVENTION

Accordingly, it is an object of the present invention to provide a method of making a crystal free from the drawbacks encountered in the prior art.

It is another object of the present invention to provide a method of making a crystal compound on a substrate with use of an open ended tube.

DESCRIPTION OF THE PREFERRED EMBODIMENT

Figures 1, 2:
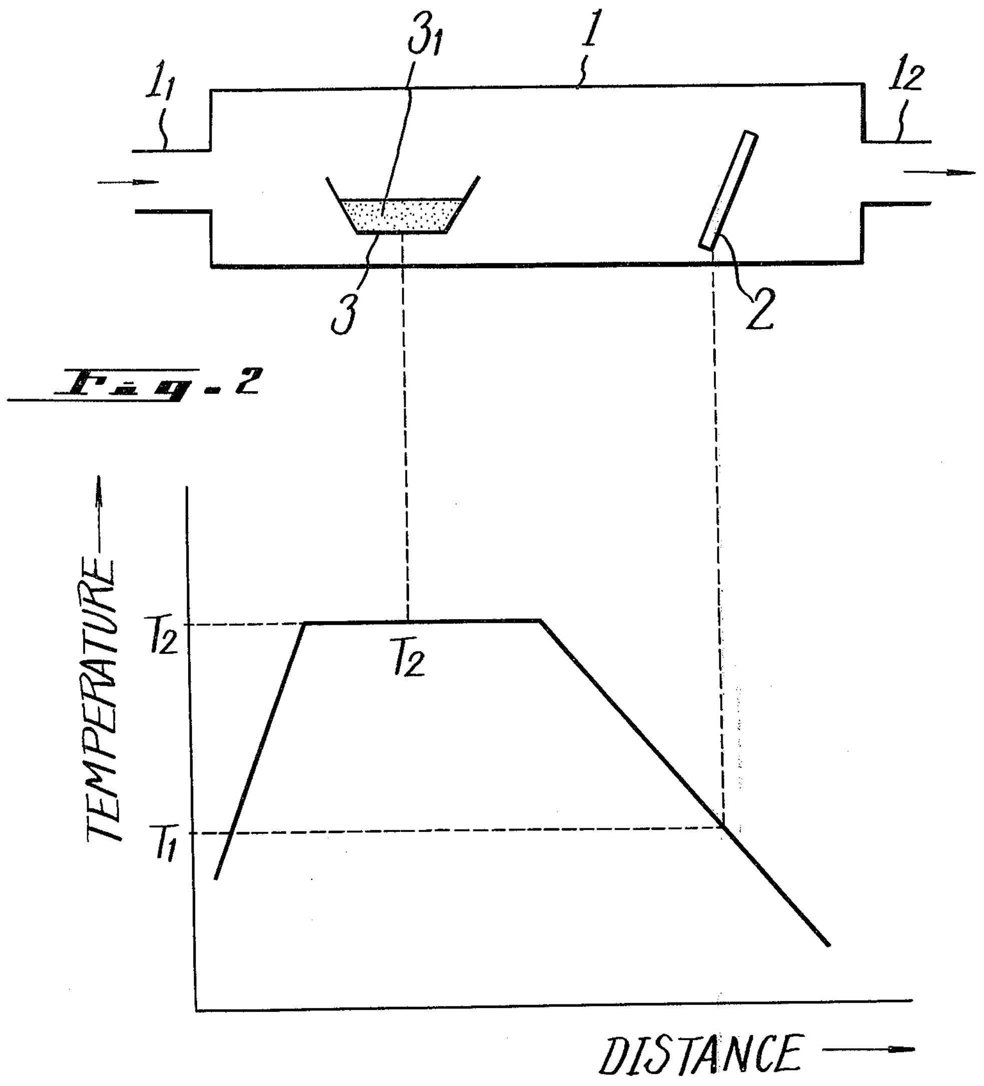
FIG. 1 is a schematic diagram of an apparatus used for embodying a method of the present invention.
FIG. 2 is a graph showing a temperature distribution curve for explaining the method of the present invention.

With reference to FIGS. 1 and 2, a description will be given on an example of the present invention.

The present invention is based on the discovery that if different carrier gases are employed for making of, for example, a semiconductor crystal on a substrate, the substrate can be held in different temperature regions at which the semiconductor crystal may be formed and also that if the respective carrier gas holds the substrate higher in temperature than its upper limit at which the semiconductor crystal can be formed, the substrate is gas-etched with the gas. By way of example, when a semiconductor crystal of compound of the III–V group elements such, for example, as a compound GaAs is formed, it can be accomplished in a lower temperature with the employment of argon as a carrier gas than with the employment of hydrogen as a carrier gas.

In FIG. 1 reference numeral 1 designates a reaction tube both ends $1_1$ and $1_2$ of which are opened. In the reaction tube 1 there are disposed a substrate 2 and a boat 3 spaced apart from each other. The boat 3 contains therein a raw material $3_1$ which consists of, for example, one of the III group elements (A).

With the invention, the substrate 2 is held at a temperature $T_1$ higher than upper limit of the temperature at which a crystal can be grown with argon as a carrier gas but within temperature at which a crystal is grown with hydrogen as a carrier gas, while the raw material $3_1$ in the boat 3 is held at temperature $T_2$ higher than the temperature $T_1$ as shown in FIG. 2. Thereafter, if argon gas with suitable gaseous etchant is introduced into the reaction tube 1 from its inlet $1_1$ near the boat $3_1$ to the outlet $1_2$ and passes by the substrate 2, the substrate 2 is subjected to a gas-etching process and will be gas-etched on its surface. After the substrate 2 is gas-etched, a mixture of hydrogen as a carrier gas with gaseous transport agent, by way of example, is introduced into the reaction tube 1 from the inlet $1_1$ in the same direction as that of the argon gas to produce a reaction similar to that which occurred in the prior art on the raw material and also on the surface of the substrate 2 to initiate the growth of a semiconductor substrate of the III–V group compound.

According to the invention described above, since the gas-etching of the substrate 2 and also the growth of the semiconductor crystal on the substrate 2 are both carried out only by changing the gases introduced into the reaction tube 1 without changing or controlling the temperature of the substrate 2, the semiconductor crystal can be easily made with a simple and inexpensive apparatus.

Further, since according to the invention the change between the gas-etching process and the crystal growth process can be attained rapidly or in short time and the substrate is always held at rather low temperature, any impurity is prevented from being introduced into the substrate.

Example I

A quartz glass tube with its inner diameter of 20 cm. is employed as the reaction tube 1. A plate of gallium arsenide (GaAs) is used as the substrate 2 and metal indium is employed as the raw material $3_1$. With the substrate 2 being held at a temperature of about 630°C and the raw material $3_1$ at temperature of about 900°C, the argon gas is first introduced into the reaction tube 1 at a flow rate of 20 $cm^3$/min through a liquid of phosphorus trichloride ($PCl_3$) kept at temperature of 0°C, that is, the mixture of the argon gas with the gaseous phosphorus trichloride is introduced into the reaction tube 1 from its inlet $1_1$ at flow rate of 20 $cm^3$/min to gas-etch the surface of the substrate 2 as a mirror surface. Thereafter, hydrogen gas mixed with gaseous phosphorus trichloride ($PCl_3$) is introduced into the reaction tube 1 from its inlet $1_1$ at the flow rate of 20 $cm^3$/min as in the argon gas to grow a crystal of indium phosphide (InP) on the substrate 2 of gallium arsenide (GaAs).

In this case, when the argon is used as the carrier gas, the GaAs substrate 2 is kept at temperature of 450° to ~ 500°C, while when the hydrogen is used as the carrier gas, the same substrate 2 is kept at temperature of 550° to ~ 650°C, the crystal InP with high quality is grown on the substrate 2. However, if the substrate 2 is subjected to higher temperature conditions than those stated above, it is etched on its surface.

Further, since the etching speed of the substrate 2 is in proportion to the flow rate of the carrier gas with the etchant, if the etching of the substrate 2 is desired to be carried out rapidly, the flow rate of the carrier gas with the etchant is increased.

Example II

A gallium arsenide (GaAs) plate is also used as the substrate 2 and an alloy of indium (in) and gallium (Ga) with the molar rate of 0.02 is used as the raw material $3_1$ with the reaction tube similar to that employed in Example I. The GaAs substrate 2 is kept at temperature of about 800°C while the In-Ga alloy raw material $3_1$ at temperature of about 900°C and thereafter the argon mixed with gaseous phosphorus trichloride is introduced into the reaction tube 1 from its inlet $1_1$ as in the case of the Example I to gas-etch the substrate 2. Then, hydrogen gas mixtured with gaseous phosphorus trichloride ($PCl_3$) is introduced into the reaction tube 1 from its inlet $1_1$ to grow a crystal of the compound $In_{0.2}Ga_{0.8}P$ on the substrate 2 of GaAs.

In this case, the GaAs substrate 2 is kept at temperature lower than 720°C when argon is used as the carrier gas, while is kept at temperature lower than 830°C when hydrogen is used as the carrier gas with the result that a crystal compound of $In_{1-x}Ga_xP$ is obtained on the substrate 2 with high quality where x represents a number between 1 and 0. In this case, the composition of the crystal compound is greatly dependent upon the temperature of the substrate 2 and if the temperature of the substrate 2 becomes high, the compound becomes a compound GaP. Accordingly, if the temperature of the substrate 2 changes during the growth of the crystal compound, the composition of the crystal compound thus grown also changes in accordance therewith, so that the variation of the temperature change in the substrate 2 is desired to be as small as possible.

It is, however, very easy to keep the substrate 2 at a constant temperature with the invention during the growth of the crystal compound, in other words, the substrate 2 is kept at constant temperature in the invention so that the crystal compound with the same composition can be easily obtained.

It will be apparent that many changes and variations can be effected without departing from the scope of the novel concepts of the invention, so that the scope of the invention should be limited to the appended claims only.

We claim as our invention:

1. A method of growing a crystal comprising steps in the following sequence:

a. disposing a substrate of gallium arsenide inside one end of an open tube;

b. disposing indium in said open tube near the second end and heating it to about 900° C;

c. passing a first gas over said indium and said substrate comprising a mixture of argon and gaseous phosphorous trichloride into said tube from the second end and at a flow rate of about 20 $cm^3$ per minute to gas etch the surface of said substrate while the substrate is at a temperature of about 450°–500° C; and d. passing a second gas over said indium and said substrate comprising a mixture of hydrogen and gaseous phosphorous trichloride into said tube from the second end at a flow rate of about 20 $cm^3$ per minute to grow a crystal of indium phosphide on said substrate while the substrate is at a temperature of about 550°–650° C.

* * * * *